US008923866B2

(12) United States Patent
Tanaka et al.

(10) Patent No.: US 8,923,866 B2
(45) Date of Patent: Dec. 30, 2014

(54) HANDOVER MANAGEMENT APPARATUS, BASE STATION, AND HANDOVER MANAGEMENT METHOD

(71) Applicant: Hitachi, Ltd., Tokyo (JP)

(72) Inventors: Ryouichi Tanaka, Yokohama (JP); Koji Wakayama, Yokohama (JP); Tsuyoshi Kajita, Fujisawa (JP); Tomonori Yamamoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 13/761,667

(22) Filed: Feb. 7, 2013

(65) Prior Publication Data

US 2013/0244658 A1     Sep. 19, 2013

(30) Foreign Application Priority Data

Mar. 16, 2012 (JP) ................................ 2012-060554

(51) Int. Cl.
*H04W 36/00* (2009.01)
*H04M 3/16* (2006.01)
*H04W 4/00* (2009.01)

(52) U.S. Cl.
CPC ...... *H04W 36/0005* (2013.01); *H04W 36/0055* (2013.01)
USPC ............ 455/436; 455/411; 370/328; 370/235

(58) Field of Classification Search
USPC ........................................................ 455/436
See application file for complete search history.

(56) References Cited

U.S. PATENT DOCUMENTS

| 2009/0046632 | A1* | 2/2009 | Nanda et al. | 370/328 |
| 2009/0047931 | A1* | 2/2009 | Nanda et al. | 455/411 |
| 2009/0092078 | A1* | 4/2009 | Czaja et al. | 370/328 |
| 2009/0196221 | A1* | 8/2009 | Horn et al. | 370/328 |
| 2011/0125510 | A1* | 5/2011 | Ho | 705/1.1 |
| 2012/0083245 | A1* | 4/2012 | Adjakple et al. | 455/411 |
| 2012/0218897 | A1* | 8/2012 | Aramoto et al. | 370/235 |

FOREIGN PATENT DOCUMENTS

JP         2010-147682 A      1/2010

* cited by examiner

*Primary Examiner* — Timothy Pham
(74) *Attorney, Agent, or Firm* — Mattingly & Malur, PC

(57) ABSTRACT

In femtocell operation, when a wireless communication terminal whose ID is not registered (ID unregistered terminal) has entered a femtocell's area, the disclosed invention prevents interference between the femtocell and the ID unregistered terminal and interference between the ID unregistered terminal and an ID registered radio communication terminal and prevents a decrease in the throughput of the femtocell and these terminals. In a radio coverage area formed by a radio base station, if a drop of received power from a radio communication terminal occurs and the frequency of reporting the ID of the base station now communicating with the terminal has become less than a given value, it is decided that the terminal is located indoors. For the terminal, if its handover to a femtocell was found to be rejected by MME, the terminal is temporarily permitted to be handed over to a femtocell.

15 Claims, 16 Drawing Sheets

FIG. 7

EXAMPLE OF CALL CONNECTION INFORMATION DATABASE

| RADIO COMM. TERMINAL ID | TIME | BASE STATION ID REPORTED | RECEIVED POWER AT BASE STATION |
|---|---|---|---|
| 1 | 0:00:00 | AA | -54dBm |
| 1 | 0:00:03 | AA | -38dBm |
| 2 | 0:00:15 | BB | -55dBm |
| 2 | 0:00:26 | BB | -60dBm |
| 3 | 0:00:06 | CC | -77dBm |
| 4 | 0:00:45 | DD | -68dBm |
| ... | | | |

| FEMTOCELL ID | INTERFERENCE POWER |
|---|---|
| A | -89dBm |
| A | -96dBm |
| A | -78dBm |
| B | -80dBm |
| B | -77dBm |
| C | -68dBm |
| ... | |

FIG. 8

EXAMPLE OF HANDOVER INFORMATION DATABASE

| TERMINAL ID FOR WHICH HANDOVER WAS REJECTED | FEMTOCELL ID THAT REJECTED HANDOVER |
|---|---|
| a | A |
| b | A |
| c | A |
| d | B |
| e | B |
| f | C |

FIG. 9

EXAMPLE OF HANDOVER PERMITTED TERMINAL ID LIST

| FEMTOCELL ID | CONNECTION PERMITTED TERMINAL ID | PERMITTED CONNECTION STATE |
|---|---|---|
| A | a | TEMPORARY |
| A | b | STEADY |
| A | c | STEADY |
| B | b | TEMPORARY |
| B | d | TEMPORARY |
| C | e | TEMPORARY |
| ... | ... | ... |

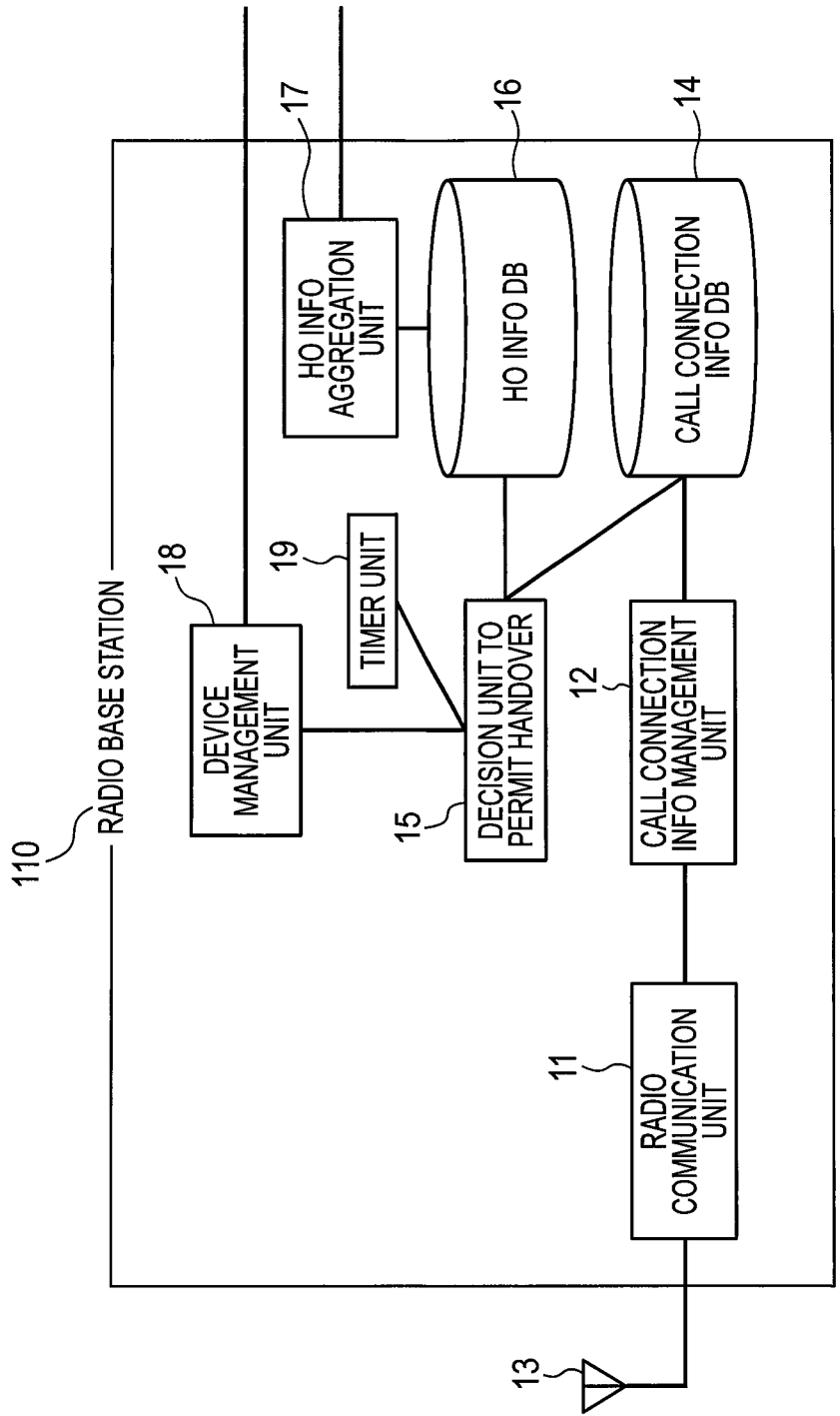

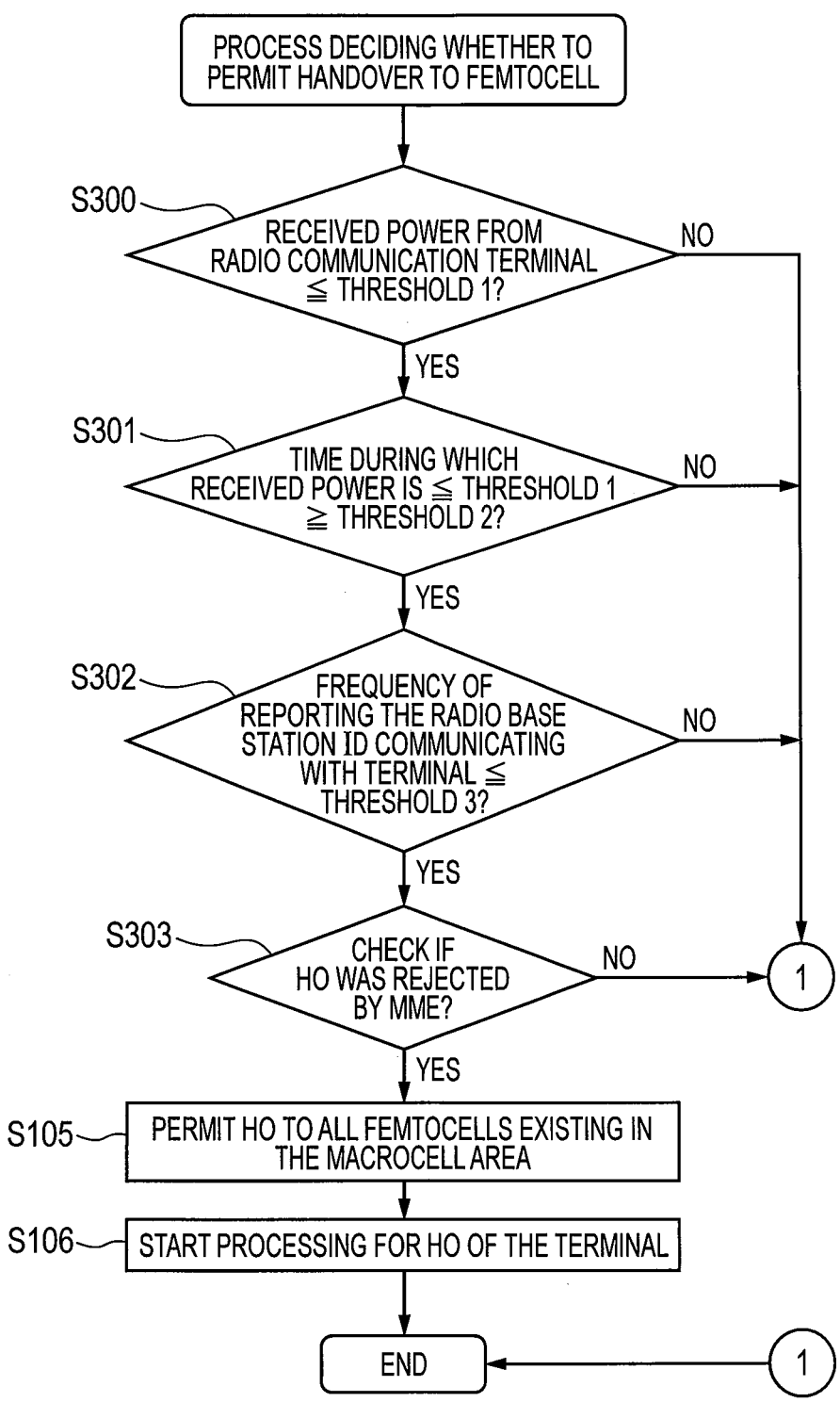

HANDOVER MANAGEMENT APPARATUS, BASE STATION, AND HANDOVER MANAGEMENT METHOD

CLAIM OF PRIORITY

The present application claims priority from Japanese patent application JP 2012-060554 filed on Mar. 16, 2012, the content of which is hereby incorporated by reference into this application.

FIELD OF THE INVENTION

The present invention relates to a handover management apparatus, a base station, and a handover management method and, in particular, to a handover management apparatus, a base station, and a handover management method for temporarily making a handover of a radio communication terminal to a base station such as a femtocell.

BACKGROUND OF THE INVENTION

While femtocells are becoming popular, they are assumed to be installed in houses or offices. Femtocell operation is assumed in such a way as to limit radio communication terminals allowed to communicate with a femtocell; that is, a radio communication terminal that can use a femtocell is only a radio communication terminal whose ID (identifier) has beforehand been registered in a Mobility Management Entity (MME).

Thus, a radio communication terminal whose ID is not registered cannot communicate with a femtocell, even if it is located indoors. This may result in a decrease in the terminal's received power from a macrocell and a decrease in its throughput. Besides, a radio communication terminal that cannot communicate with a femtocell becomes a source of interference on a radio communication terminal now communicating with the femtocell.

To solve the above-noted problem, in Japanese Unexamined Patent Application Publication No. 2010-147682, a method is adopted in which a propagation loss between a radio communication terminal and a femtocell is calculated at the femtocell and, if the propagation loss is less than a given value, a handover of the terminal from a macrocell to the femtocell is executed. Thereby, this method makes only terminal actually located indoors connect to the femtocell and prevents a radio communication terminal located indoors from being a source of interference.

SUMMARY OF THE INVENTION

The transmission power of a femtocell is very small and its maximum transmission power is almost equivalent to that of a radio communication terminal. Consequently, when a wireless communication terminal whose ID is not registered (ID unregistered terminal) has entered a femtocell's area, this causes interference between the femtocell and the unregistered terminal and interference between the ID unregistered terminal and a radio communication terminal whose ID is registered (ID registered terminal). There is a problem in which a throughput decrease occurs in both the femtocell and each of the ID registered and unregistered terminals.

In the method of related art in Japanese Unexamined Patent Application Publication No. 2010-147682 mentioned above, only a propagation loss across a radio section is measured. This method does not enable a handover of an ID unregistered terminal to a femtocell with which only ID registered terminals are allowed to communicate and cannot cope with the above-noted problem.

In view of the above described respects, an object of the present invention is to provide a handover management apparatus, a base station, and a handover management method capable of temporarily making a handover of a radio communication terminal that may become a source of interference to a femtocell.

In a radio communication system in which a femtocell exists, this invention provides efficient use of traffic, suppresses interference between the femtocell and a radio communication terminal, and improves throughput in the femtocell's radio coverage area by temporarily adding/deleting the ID of a radio communication terminal allowed to communicate with the femtocell.

In the light of received power from a radio communication terminal in a radio coverage area formed by a radio base station and the frequency of reporting the ID of a radio base station from which the terminal received radio waves, it is decided that the terminal exists indoors. In a case that the terminal was rejected to be handed over to a femtocell by MME because its ID is not registered, its handover to a femtocell is enabled by temporarily permitting a handover to a femtocell.

A system disclosed herein is as follows: in a radio communication system where there are a radio base station, a femtocell, an MME that executes a handover to the base station and femtocell, a network device typified by a HeNBGW (femtocell gateway), and a handover management apparatus (control device) that manages these entities, the handover management apparatus collects received power from a radio communication terminal in a radio coverage area formed by a radio base station and reported IDs of radio base stations from which the terminal received radio waves. On feature resides in that this system includes a call connection information aggregation unit that creates and updates a call connection information database from a set of information collected, a handover information aggregation unit that collects information on a rejected handover because of unregistered ID from the MME and creates and updates a handover information database, a decision unit to permit handover that decides whether to permit a handover to a femtocell by referring to the above two databases, a device management unit that executes adding and deleting the ID of a radio communication terminal allowed to be handed over to a femtocell, and a timer unit for periodical operation control.

One feature resides in that, if time during which the received power from a radio communication terminal is not more than a threshold has become longer than a given period of time, the decision unit to permit handover decides that the terminal is located indoors.

One feature resides in that the decision unit to permit handover detects that a handover of the terminal was rejected by the MME because of the ID unregistered terminal.

One feature resides in that, if there is a radio communication terminal fulfilling two conditions described above, the decision unit to permit handover temporarily permits a handover of the terminal to all femtocells in a radio coverage area formed by an outdoor radio base station.

One feature resides in that, when the terminal temporarily permitted to be handed over to the femtocell has been handed over again to an outdoor radio base station, the decision unit to permit handover deletes the ID of the temporarily permitted terminal.

According to a first solution of the present invention, a handover management apparatus is applied in a network system including a first base station, a second base station whose coverage cell overlaps with a cell of the first base station, and a management device that manages permission/rejection information indicating whether or not a handover to a second base station is permitted.

The handover management apparatus includes:

a connection information management unit that acquires, from the first base station, received power from a radio terminal at the first base station at given intervals;

a handover information management unit that acquires, from the management device, the identifier of a radio terminal rejected to be handed over to a second base station; and a decision unit to permit handover that finds a radio terminal fulfilling a first condition that the received power from the radio terminal acquired by the connection information management unit is not more than a predetermined first threshold and a state in which the received power is not more than the first threshold continues for a predetermined period of time and transmits to the management device a request to temporarily permit a handover of the thus found radio terminal to a second base station.

According to a second solution of the present invention, a base station is applied in a network system including a first base station, a second base station whose coverage cell overlaps with a cell of the first base station, and a management device that manages permission/rejection information indicating whether or not a handover to a second base station is permitted. The base station is the first base station and includes:

a connection information management unit that acquires received power from a radio terminal at given intervals;

a handover information management unit that acquires, from the management device, the identifier of a radio terminal rejected to be handed over to a second base station; and a decision unit to permit handover that finds a radio terminal fulfilling a first condition that the received power from the radio terminal acquired by the connection information management unit is not more than a predetermined first threshold and a state in which the received power is not more than the first threshold continues for a predetermined period of time and transmits to the management device a request to temporarily permit a handover of the thus found radio terminal to a second base station.

According to a third solution of the present invention, a handover management method is applied in a network system including a first base station, a second base station whose coverage cell overlaps with a cell of the first base station, and a management device that manages permission/rejection information indicating whether or not a handover to a second base station is permitted.

The handover management method includes:

acquiring received power from a radio terminal at a first base station at given intervals;

acquiring, from the management device, the identifier of a radio terminal rejected to be handed over to a second base station;

finding a radio terminal fulfilling a first condition that the received power from the radio terminal acquired is not more than a predetermined first threshold and a state in which the received power is not more than the first threshold continues for a predetermined period of time; and transmitting to the management device a request to temporarily permit a handover of the thus found radio terminal to a second base station.

According to the present invention, it is possible to temporarily make a handover of a radio communication terminal that may become a source of interference to a base station such as a femtocell. Besides, it can be expected to remove a source of interference on a femtocell and improve throughput.

BRIEF DESCRIPTION OF THE DRAWINGS

FIG. 7 shows an example a call connection information database;

FIG. 8 shows an example a handover information database;

FIG. 9 shows an example a handover permitted terminal ID list;

FIG. 17 is a structural diagram of a radio base station in the second embodiment; and FIG. 18 is a flowchart for deciding whether to permit a handover to a femtocell according to the second embodiment.

DETAILED DESCRIPTION OF THE PREFERRED EMBODIMENTS

Then, embodiments for implementing the present invention will be described in detail with the aid of the drawings.

1. FIRST EMBODIMENT

Figure 1:
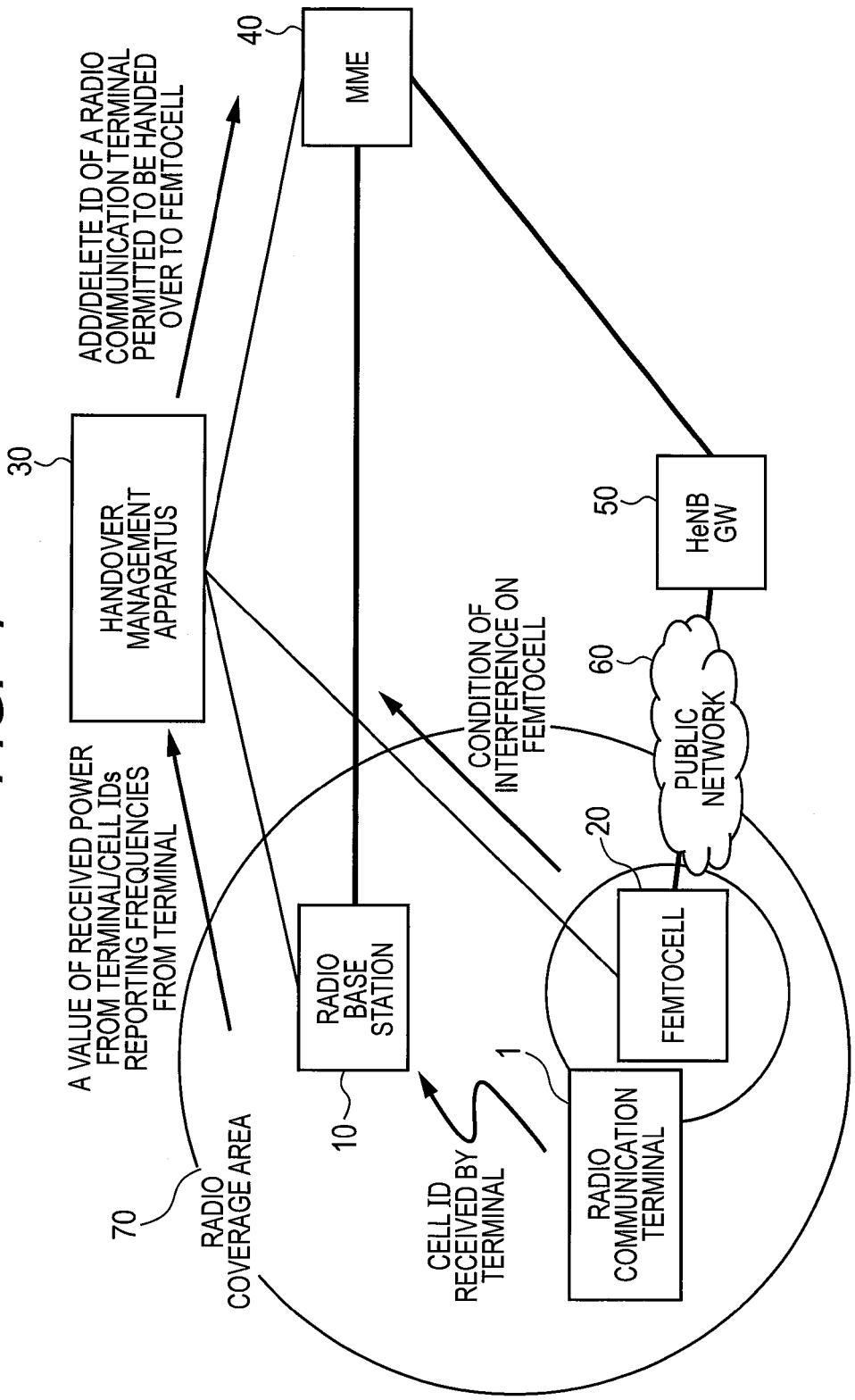
FIG. 1 is an entire architectural diagram of a system according to a first embodiment.

FIG. 1 is an architectural diagram of a radio communication system according to a first embodiment.

The radio communication system includes, for example, a radio base station 10, a femtocell (also called a femto base station; the term "femtocell" is used hereinafter) 20, a handover management apparatus 30, and an MME (management device). The system may further include a HeNBGW 50 and a radio communication terminal 1. It should be noted that a plurality of femtocells (second base stations) may be provided in an area formed by the radio base station (first base station) 10. Although one radio base station 10 is illustrated in FIG. 1, a plurality of radio base stations 10 may be provided.

The radio communication terminal 1 communicates with the radio base station 10 and the femtocell 20 exists in an area formed by the radio base station 10. Therefore, the areas covered by the respective base stations may overlap or one area may be included in the other area. In this situation, the radio communication terminal 1 reports the ID(s) of one or more radio base stations and femtocells from which it received radio waves (this ID will be referred to as a base station ID hereinafter) to the radio base station 10. The radio base station 10 collects reported base station IDs and received power at the radio base station from a radio communication terminal 1 and reports a value of received power from the radio communication terminal 1 and the frequency of reporting each base station ID to the handover management apparatus 30.

The handover management apparatus 30 sends to the MME 40 a request to add/delete the ID of a radio communication terminal 1 that can be handed over to a femtocell 20. The MME 40 sends a handover request to the femtocell 20 via the HeNBGW 50 and a public network 60.

Although the embodiment is described here, taking the femtocell as an example, it does not apply only to the femtocell and an appropriate base station placed indoors and having an area relatively smaller than the area of the radio base station 10 may replace the femtocell.

Figure 2:
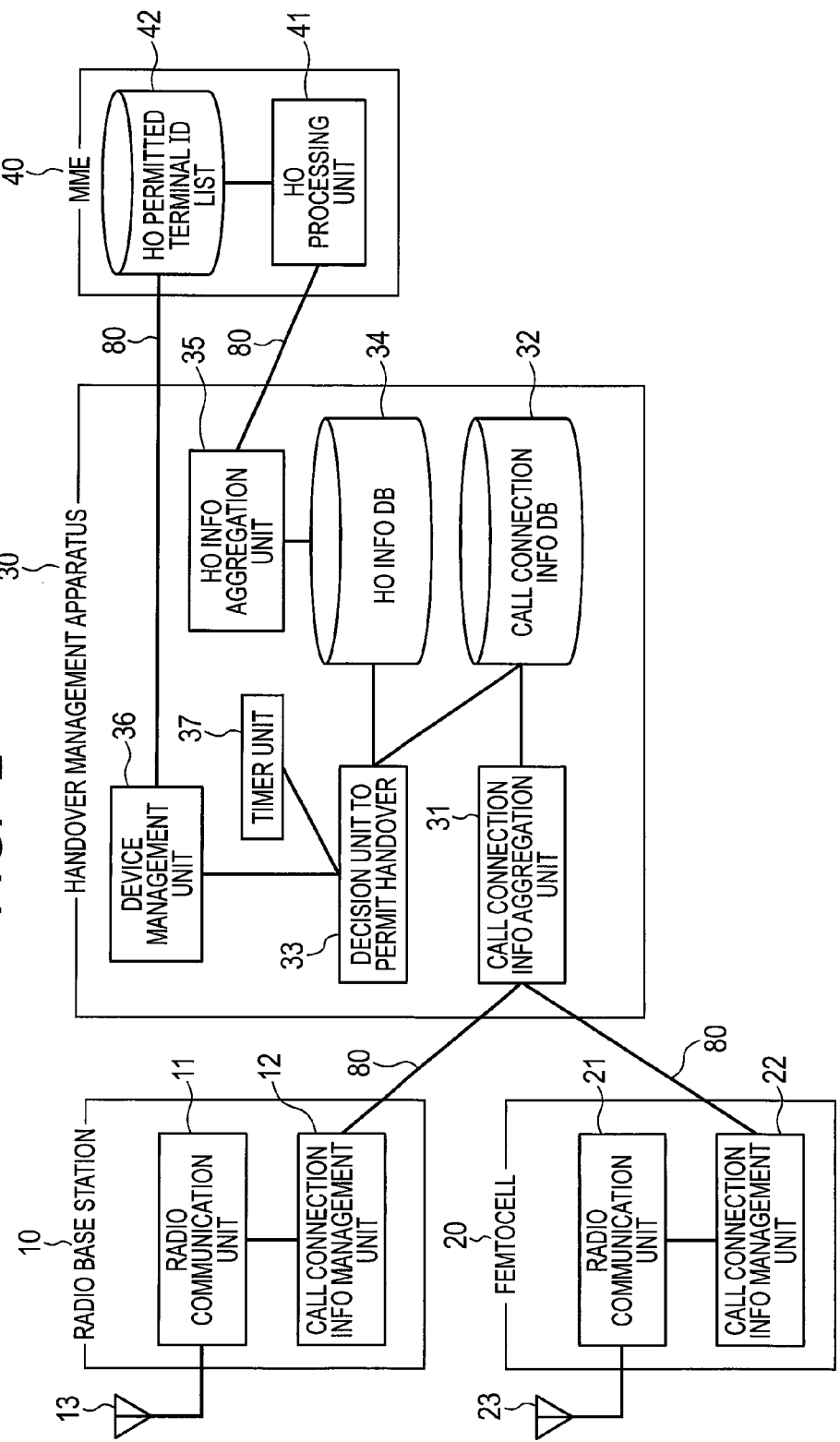
FIG. 2 is a detailed structural diagram of the system according to the first embodiment.

FIG. 2 is a detailed structural diagram of a management system according to the first embodiment. With regard to each device in the radio communication system shown in FIG. 2, blocks relevant to the present embodiment are shown. Each device may include appropriate blocks for data communication and transmitting/receiving control signals, other than the blocks shown here.

The radio base station 10 includes a radio communication unit 11 connected to an antenna 13 and a call connection information management unit 12. A radio base station ID reported and received power from a radio communication terminal 1 are received by the antenna 13 and sent via the radio communication unit 11 to the call connection information management unit 12. The call connection information management unit 12 transmits these pieces of information collected from the radio communication terminal 1 to a call processing information aggregation unit 31 in the handover management apparatus 30 via a wired network 80.

The femtocell 20 includes a radio communication unit 21 connected to an antenna 23 and a call connection information management unit 22. Interference power from a radio communication terminal 1 that communicates with the radio base station 10 is received by the antenna 23 and sent via the radio communication unit 21 to the call connection information management unit 22. The call connection information management unit 22 transmits this information to the call processing information aggregation unit 31 in the handover management apparatus 30 via a wired network 80.

In the handover management apparatus 30, the call connection information aggregation unit (connection information management unit) 31 that received information from the radio base station 10 and the femtocell 20 updates a call connection information database (DB) 32. A handover (HO) information aggregation unit 35 is connected with a handover (HO) processing unit 41 in the MME 40 via a wired network 80. The handover information aggregation unit (handover information management unit) 35 collects information on a rejected handover of a radio communication terminal to a femtocell 20 when the handover processing unit 41 has decided to reject the handover because the radio communication terminal ID is not registered and updates a handover (HO) information database (DB) 34. A decision unit to permit handover 33 refers to the call connection information database 32 and the handover information database 34, extracts the ID of a radio communication terminal that should be temporarily permitted to be handed over to a femtocell 20 or should be deleted, and sends the extracted radio communication terminal ID to a device management unit 36. The device management unit 36 having received it updates a handover permitted terminal ID list 42 in the MME 40 connected with it by a wired network 80. By using a timer unit 37, it is possible to execute these processes described above periodically. The wired networks 80 between each device may be implemented by radio networks.

Figure 3:
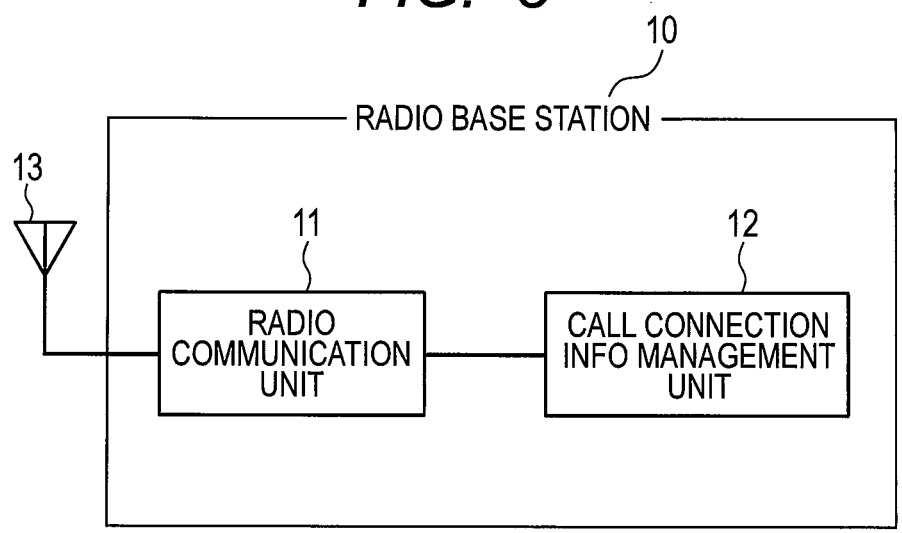
FIG. 3 is a structural diagram of a radio base station.

FIG. 3 is a structural diagram of a radio base station 10 in the first embodiment. The radio base station 10 has, for example, an antenna 13 for radio communication with a radio communication terminal 1, a radio communication unit 11 that processes a signal received from the antenna 13 or a transmission signal to a radio communication terminal 1, and a call connection information management unit 12 that handles received power and radio base station IDs from a radio communication terminal 1.

Figure 4:
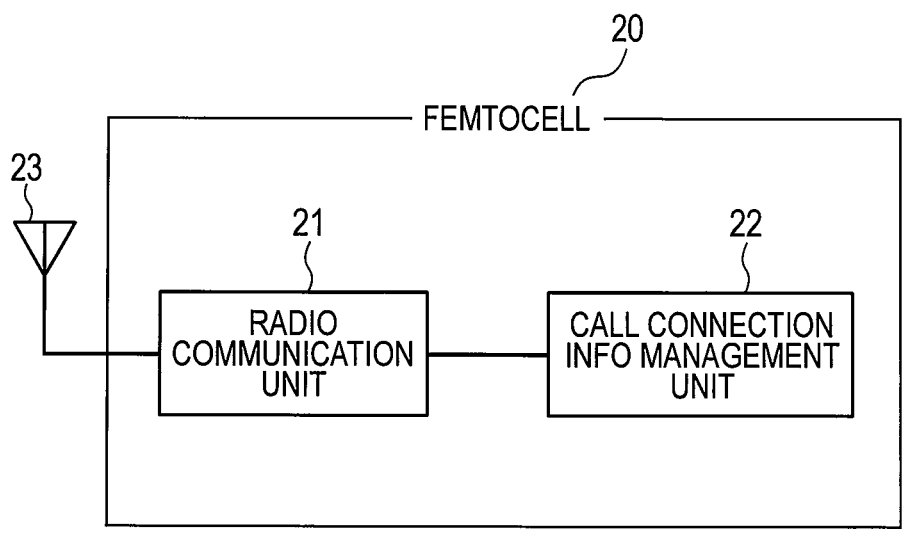
FIG. 4 is a structural diagram of a femtocell base station.

FIG. 4 is a structural diagram of a femtocell 20 in the first embodiment. The femtocell 20 has, for example, an antenna 23 for radio communication with a radio communication terminal 1, a radio communication unit 21 that processes a signal received from the antenna 23 or a transmission signal to a radio communication terminal 1, and a call connection information management unit 22 that collects interference power.

Figure 5:
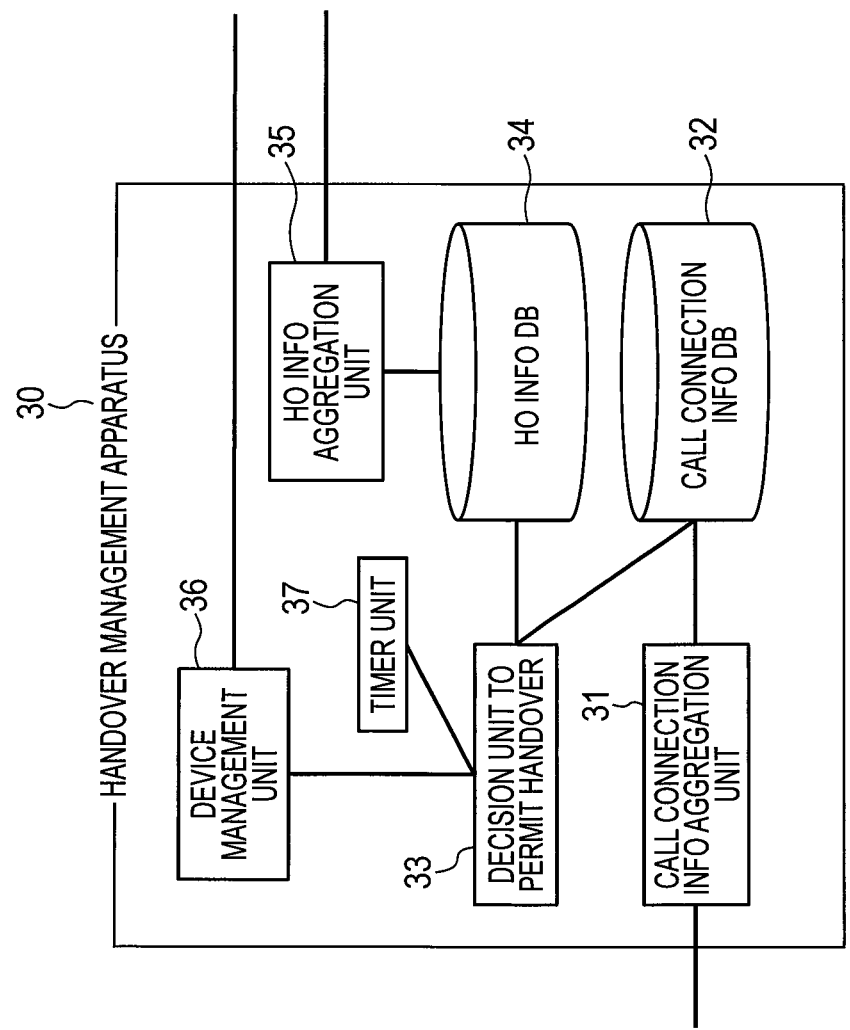
FIG. 5 is a structural diagram of a handover management apparatus.

FIG. 5 is a structural diagram of the handover management apparatus 30 in the first embodiment. The handover management apparatus 30 has, for example, a call connection information aggregation unit 31 that collects, from the radio base station 10, received power and the frequency of reporting a base station ID for each radio communication terminal, and collects interference power from a femtocell 20, a call connection information database 32 that accumulates information collected by the call connection information aggregation unit 31, a decision unit to permit handover 33 that decides whether to temporarily permit a handover of a terminal to a femtocell, a handover information aggregation unit 35 that collects information on a rejected handover of a radio communication terminal to the femtocell 20 when the handover processing unit 41 in the MME 40 has decided to reject the handover because the radio communication terminal ID is not registered, a handover information database 34 that accumulates such information, a device management unit 36 that updates a handover permitted terminal ID list 42 in the MME 40 connected with it by a wired network 80, and a timer unit 37 for triggering control periodically.

Figure 6:
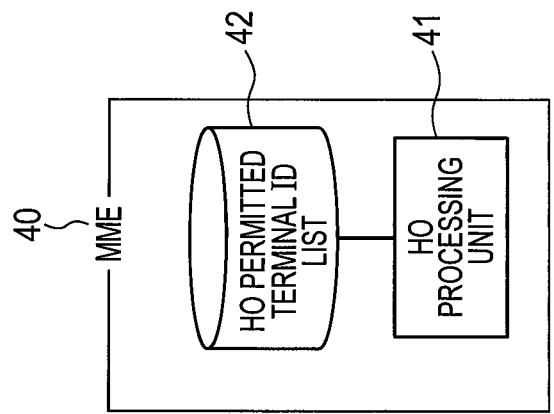
FIG. 6 is a structural diagram of an MME.

FIG. 6 is a structural diagram of the MME 40 in the first embodiment. The MME 40 includes, for example, a handover processing unit 41 that carries out a handover process and a handover permitted terminal ID list 42 in which the IDs of radio communication terminals permitted to be handed over to a femtocell are recorded with respect to each femtocell. The handover processing unit 41 is connected with the handover information aggregation unit 35 in the handover management apparatus 30 via, for example, a wired network 80. Likewise, the handover permitted terminal ID list 42 is connected with the device management unit 36 in the handover management apparatus 30.

FIG. 7 shows an example of the call connection information database 32.

The call connection information database 32 includes a table in which time at which information was collected, a base station ID reported, and reference signal received power at a base station are recorded with respect to each radio communication terminal ID and a table in which interference power is recorded with respect to each femtocell ID.

FIG. 8 shows an example of the handover information database 34. This database has a table in which a terminal ID for which a handover to a femtocell 20 was rejected is recorded, mapped to the ID of the femtocell.

FIG. 9 shows an example of the handover permitted terminal ID list 42. This database has a table in which a radio communication terminal ID that can communicate with a femtocell and whether its permitted connection state is steady or temporary are recorded with respect to each femtocell ID.

The above-mentioned tables each may be stored in an appropriate form in a storage area.

Figure 10:
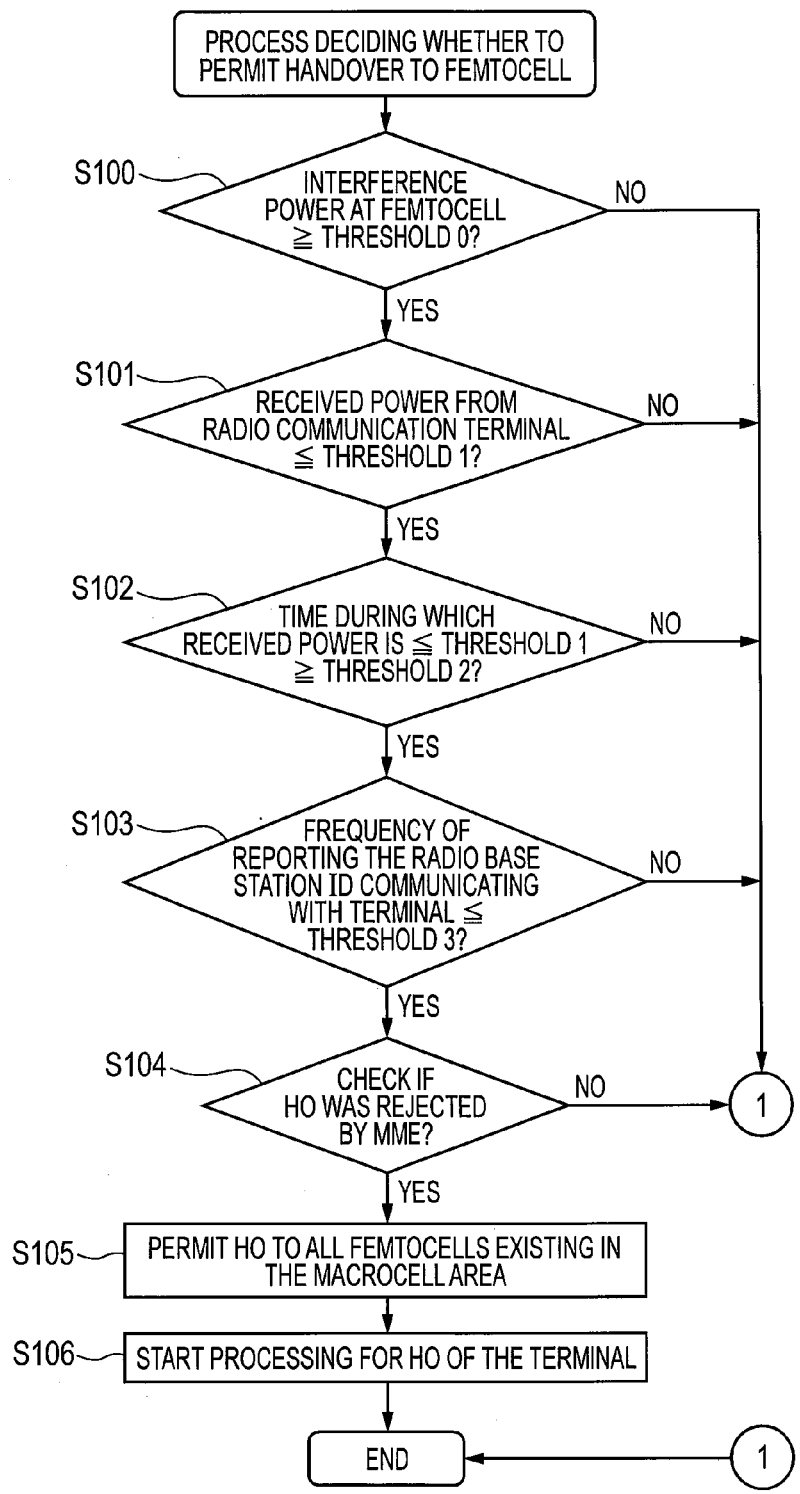
FIG. 10 is a flowchart for deciding whether to permit a handover to a femtocell according to the first embodiment.

FIG. 10 is a flowchart for the decision unit to permit handover 33 in the handover management apparatus 30 to decide whether to permit a handover to a femtocell. Its detail is explained using FIGS. 10 through 13.

First, at step S100, the decision unit to permit handover 33 decides whether the reported interference power for a femtocell placed in the radio coverage area 70 formed by the radio base station 10 is more than a predetermined threshold 0. For example, this decision is made by referring to an interference power value stored in the call connection information database 32. What femtocell(s) is placed in the radio coverage area 70 can be registered beforehand. With regard to a femtocell for which the above condition is fulfilled (Yes, as decided at S100), the following process is executed with respect to each radio communication terminal existing in the radio coverage area 70 formed by the radio base station 10.

Figure 11:
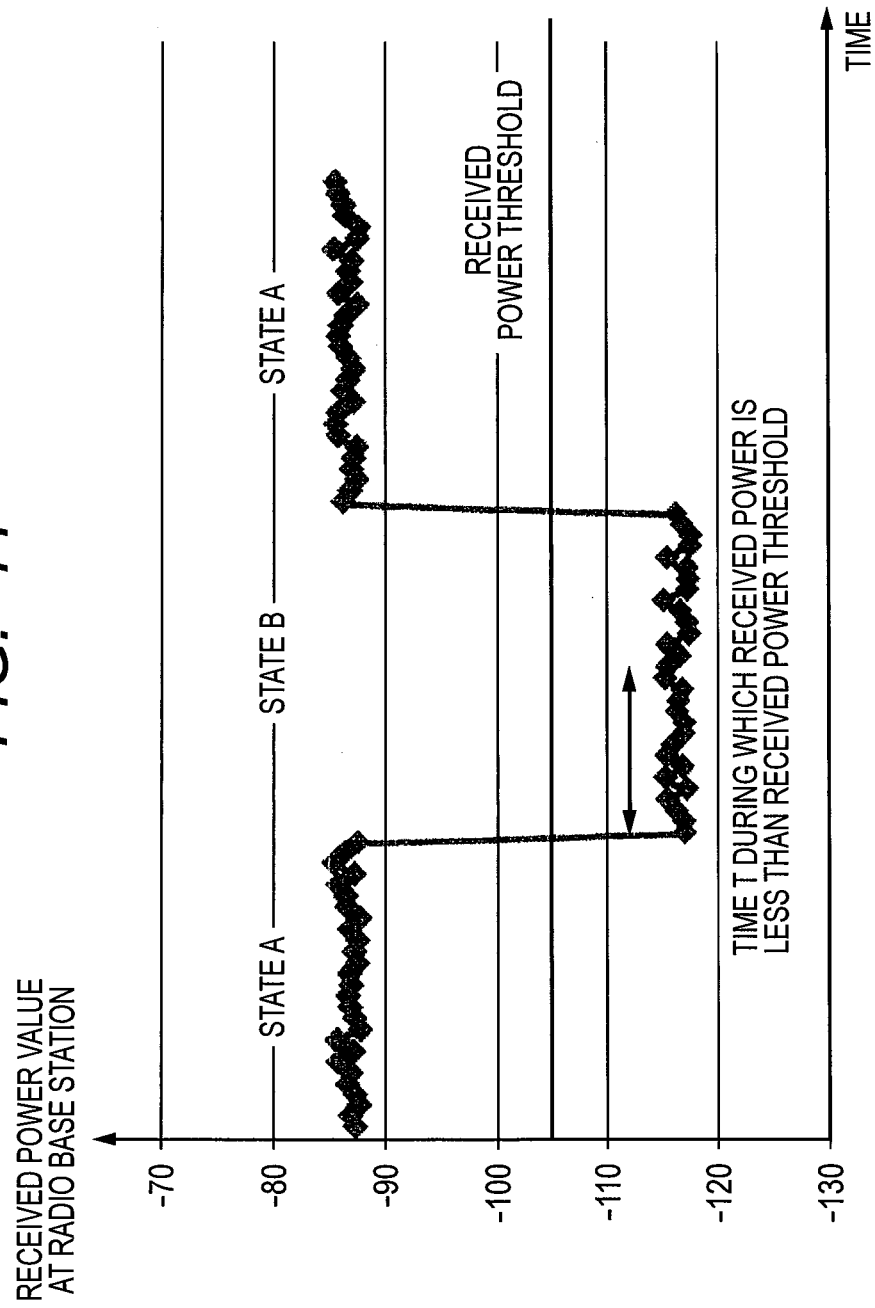
FIG. 11 shows an example of a graph representing how the received power from a radio communication terminal at a radio base station changes, as the radio communication terminal moves.

At step S101, the decision unit to permit handover 33 refers to the call connection information database 32 and decides whether received power from the radio communication terminal 1 at the radio base station 10 is less than a predetermined threshold 1. Then, at step S102, the decision unit to permit handover 33 decides whether time T during which the received power from the radio communication terminal 1 at the radio base station 10 is less than the threshold 1 is more than a predetermined threshold 2. An example hereof is illustrated in a graph of FIG. 11. Suppose that a state in which the radio communication terminal 1 exists outside is State A and a state in which radio waves are almost blocked as in an indoor location is State B. FIG. 11, for example, shows an example in a situation where the radio communication terminal 1 moves from outside to an indoor location and goes outside again. When the radio communication terminal 1 exists in an indoor place or the like where there is a construction that blocks radio waves from an outdoor radio base station communicating with the terminal, the received power from the radio communication terminal 1 drastically decreases at the outdoor radio base station communicating with the terminal. Even if the transmission power of the radio communication terminal 1 has been increased to an upper limit, the received power from the radio communication terminal 1 at the radio base station 10 drops. Even if being outdoors, for example, when the terminal is in a site shaded by a building or moving cars, a case arises where the received power from the radio communication terminal 1 drops for a while at the outdoor radio base station. However, such a case is excluded, because it is decided whether the drop of received power has continued for a predetermined time or longer in the present embodiment.

Figure 12:
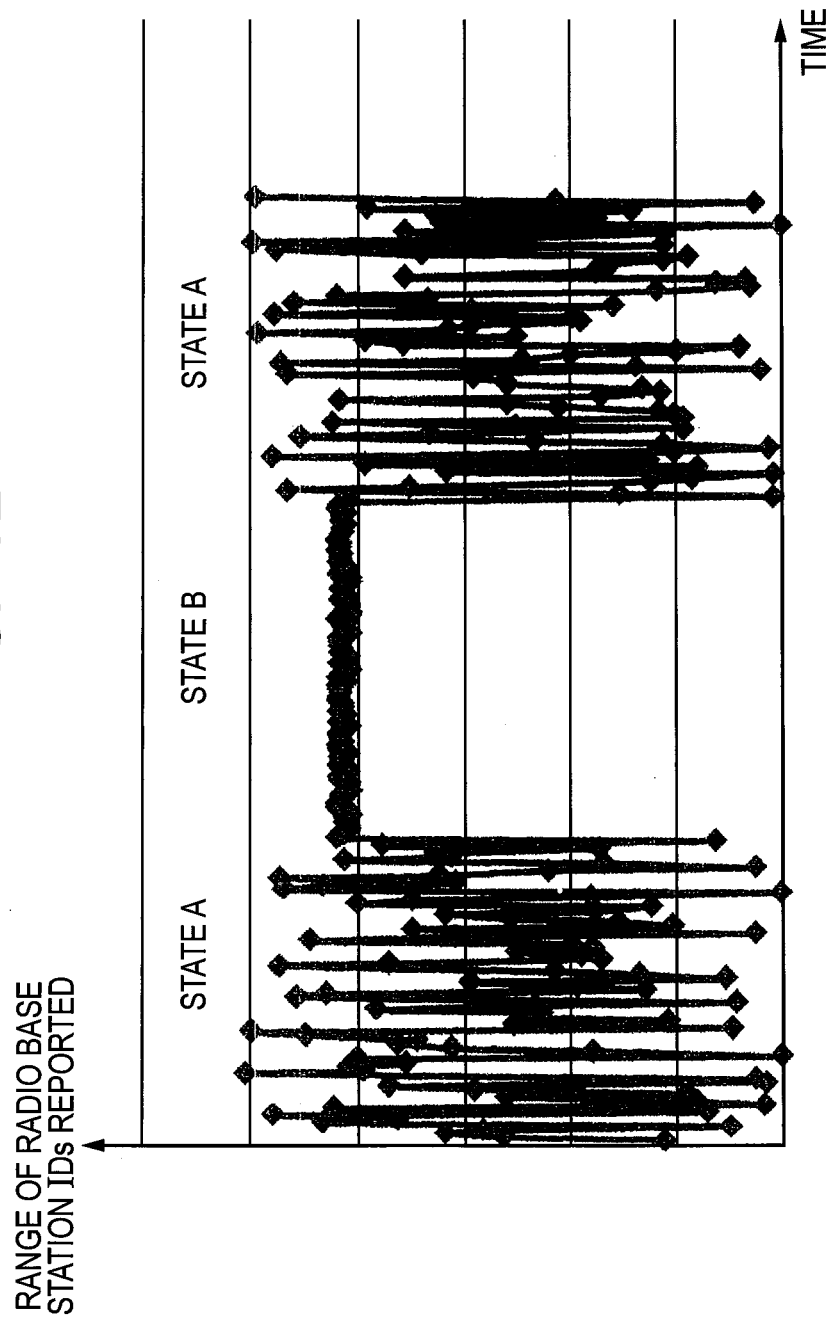
FIG. 12 shows an example of a graph how the range of radio base station IDs reported from the radio communication terminal changes, as the radio communication terminal moves.
Figure 13:
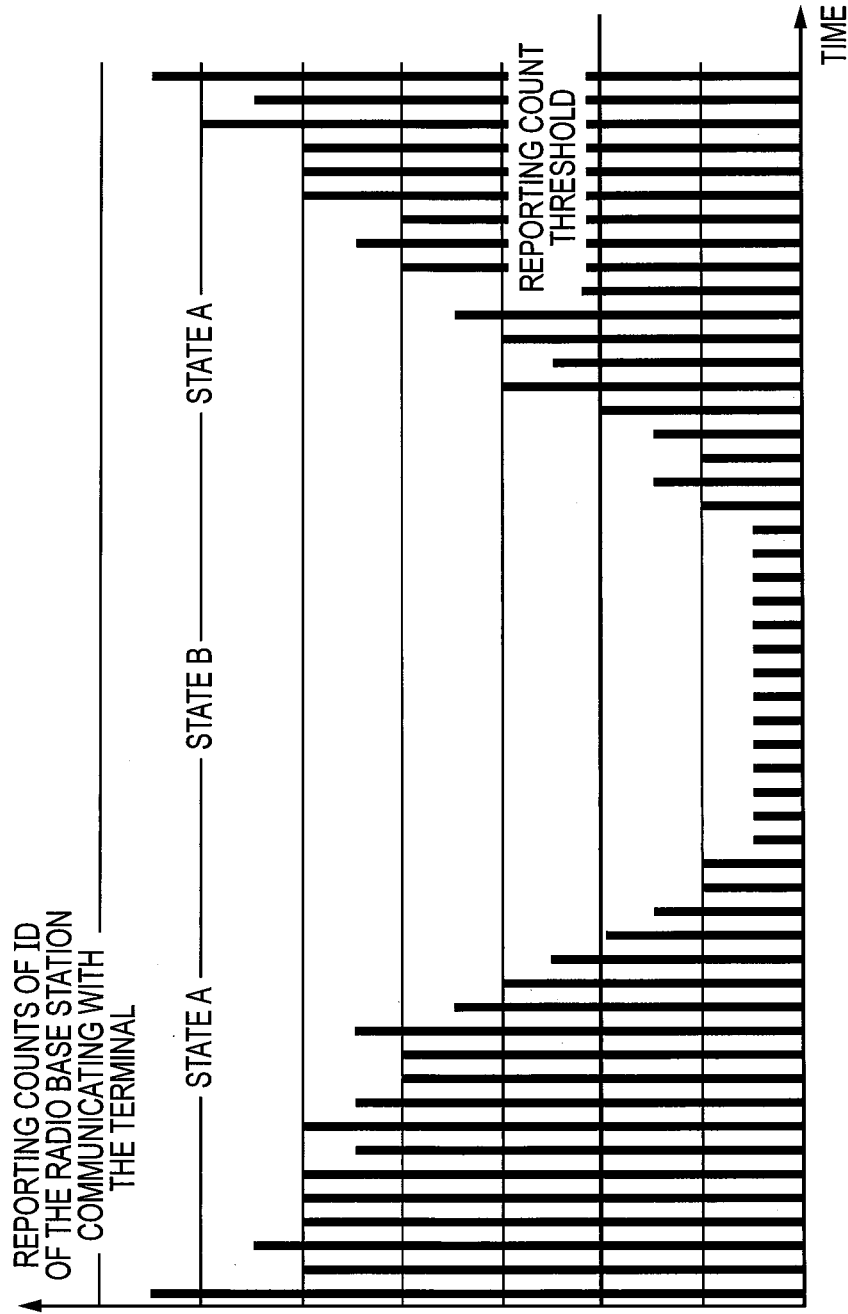
FIG. 13 shows an example of a graph how the frequency of reporting the radio base station ID now communicating with the terminal from the radio communication terminal changes, as the radio communication terminal moves.

Next, at step S103, the decision unit to permit handover 33 decides whether the frequency in which the ID of the radio base station 10 currently communicating with the terminal is reported from the radio communication terminal 1 is less than a predetermined threshold 3. An example of hereof is illustrated in FIGS. 12 and 13. As illustrated in FIG. 12, in State A in which the radio communication terminal 1 exists outdoors, the radio communication terminal 1 can receive radio waves from radio base stations existing around the terminal and, thus, many radio base station IDs are detected and reported by the radio communication terminal 1. On the other hand, when the radio communication terminal 1 exists indoors, as in State B, received power from a radio base station far from the terminal is blocked by walls or the like and becomes not enough to be received by the terminal. Thus, the ID of such a radio base stations far from the terminal is not reported. The frequency of reporting the ID of a radio base station near the terminal also decreases because of a decrease in power due to blockage. If a femtocell exists indoors, the frequency of reporting the femtocell ID increases. Consequently, as illustrated in FIG. 13, when the radio communication terminal 1 exists indoors, as in State B, the frequency of reporting the ID of the radio base station now communicating with the terminal drops. From the foregoing, if the conditions of S101, S102, and S103 are fulfilled, it is decided that the radio communication terminal exists indoors, since the state in which the received power from the radio communication terminal dropped continues for a given period of time or longer at the radio base station 10 which is an outdoor radio base station and the frequency of reporting the ID of the radio base station 10 also decreases.

Then, at step S104, for the radio communication terminal for which the conditions of S101, S102, and S103 are fulfilled the decision unit to permit handover 33 decides whether its handover was rejected by the MME 40 because its ID is not registered. For example, this decision is made by referring to the handover information database 34. If this condition is fulfilled, at step S105, the decision unit to permit handover 33 temporarily permits the handover of the terminal to a femtocell 20 existing in the radio coverage area 70 formed by the radio base station 10. For example, the decision unit may temporarily permit the handover of the terminal to all femtocells 20 existing in the radio coverage area 70. At step S106, the decision unit to permit handover 33 executes the handover of the terminal to the relevant femtocell 20. For example, the decision unit to permit handover 33 transmits a request signal including the ID of the radio communication terminal that is temporarily permitted to be handed over to the femtocell 20 via the device management unit 35 to the MME 40 and updates the handover permitted terminal ID list 42 in the MME 40. In the handover permitted terminal ID list 42, for example, the femtocell ID and the radio communication terminal ID that is temporarily permitted to be handed over to the femtocell are stored and information indicating "temporary" is set in the corresponding permitted connection state.

In the above example, the decision unit temporarily permits the handover if the condition of step S100 (condition A), the condition of steps S101 and S102 (condition B), the condition of step S103 (condition C), and the condition of step S104 (condition D) are all fulfilled. Alternatively, the decision unit may temporarily permit the handover, if the condition B is fulfilled. Optionally, it may temporarily permit the handover, if the conditions B and D are fulfilled, if the conditions B, C, and D are fulfilled, or if the if the conditions A, B, and D are fulfilled. Other appropriate combinations of the conditions may be applied.

Moreover, the femtocell throughput may be monitored and an event that the throughput has exceeded a predetermined threshold may be added as an additional condition for temporarily permitting the handover. The decisions by the above conditions may be executed in a suitable order different from the order in the above example.

The above thresholds for decision may be set different for each radio coverage area. For example, different threshold values may be predetermined for each of the radio coverage areas covered by a plurality of radio base stations respectively.

Figure 14:
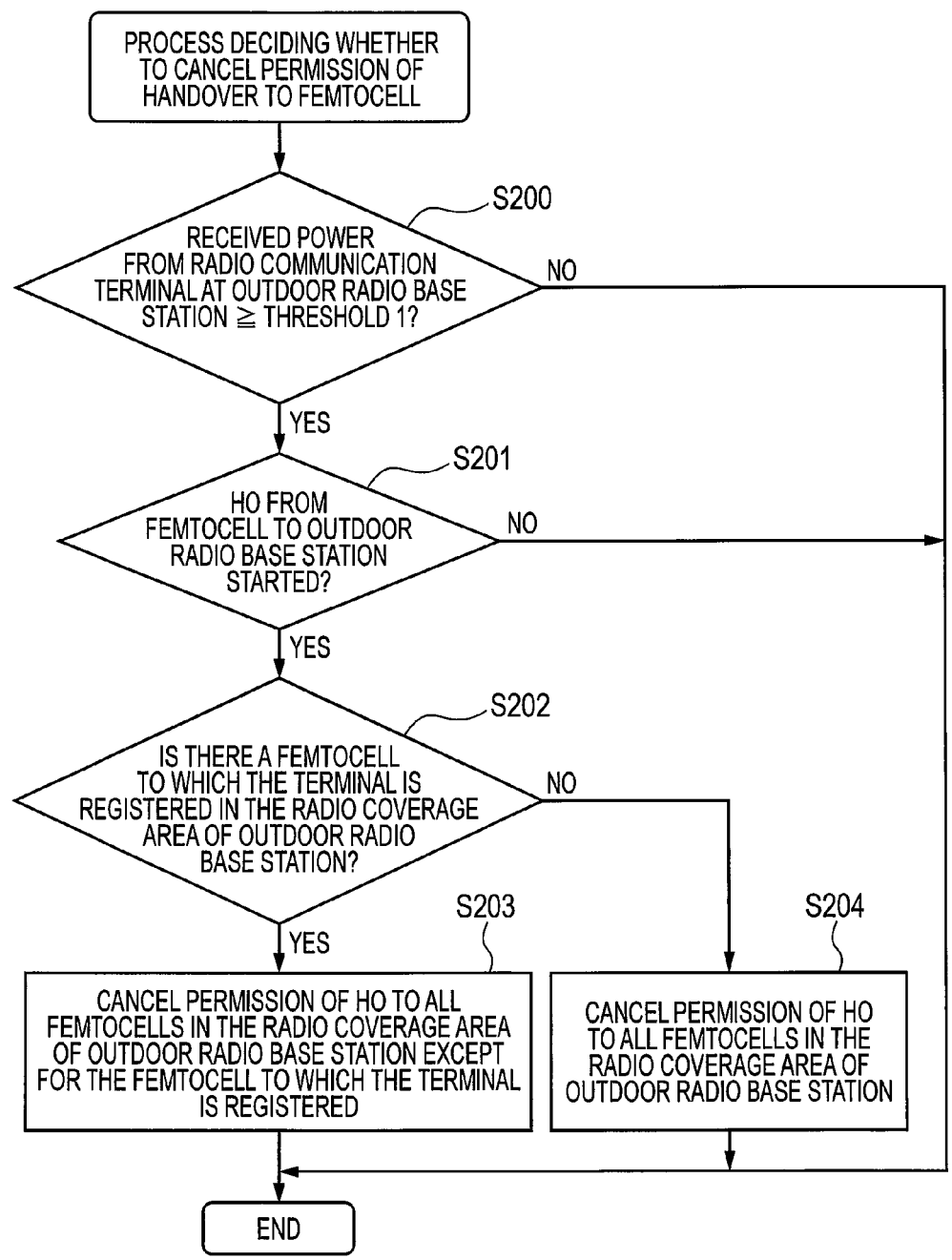
FIG. 14 is a flowchart for deciding whether to cancel permission of a handover to a femtocell.

Next, a flow of processing when the handover management apparatus 30 cancels temporary permission of a handover to a femtocell is explained using FIG. 14.

FIG. 14 is a flowchart of processing when canceling temporary permission of a handover to a femtocell. First, at step S200, the decision unit to permit handover 33 decides whether the received power from a radio communication terminal 1 at an outdoor radio base station 10 is more than the threshold 1. The radio communication terminal 1 for which the received power is more than the threshold 1 will be referred to the relevant radio communication terminal hereinafter. Then, at step S201, for the relevant radio communication terminal, the decision unit to permit handover 33 decides whether its handover from a femtocell 20 to the outdoor radio base station 10 has been executed. Once the handover of the terminal to the radio base station 10 has been executed, the decision unit decides that it no longer needs to permit the temporarily permitted handover to the femtocell 20.

However, if the relevant radio communication terminal 1 is steadily permitted to communicate with any femtocell 20 existing in the radio coverage area formed by the outdoor radio base station 10, the permission of its handover to the femtocell 20 is not canceled. Thus, at step S202, the decision unit to permit handover 33 decides whether there is a femtocell with which the relevant radio communication terminal 1 is steadily permitted to communicate among femtocells existing in the radio coverage area formed by the outdoor radio base station 10. For example, the decision unit to permit handover 33 may query the MME 40 about this. If there is such femtocell, at step S203, the decision unit to permit handover 33 cancels the permission for communicating with femtocells except for the femtocell with which the terminal is steadily permitted to communicate. For example, the decision unit to permit handover 33 transmits a cancel request including the ID of the relevant radio communication terminal 1 and the ID of the femtocell with which the terminal communicates and the permission for communicating should be canceled to the MME 40. If there is not such femtocell at step S202, the decision unit cancels the permission for communicating with all femtocells in the radio coverage area at step S204.

If "No" is decided at steps S200 and S201, the processing terminates.

2. SECOND EMBODIMENT

Next, a second embodiment will be described in detail with the aid of the drawings. In the second embodiment, a radio base station is provided with the functions of the handover management apparatus in the first embodiment.

Figure 15:
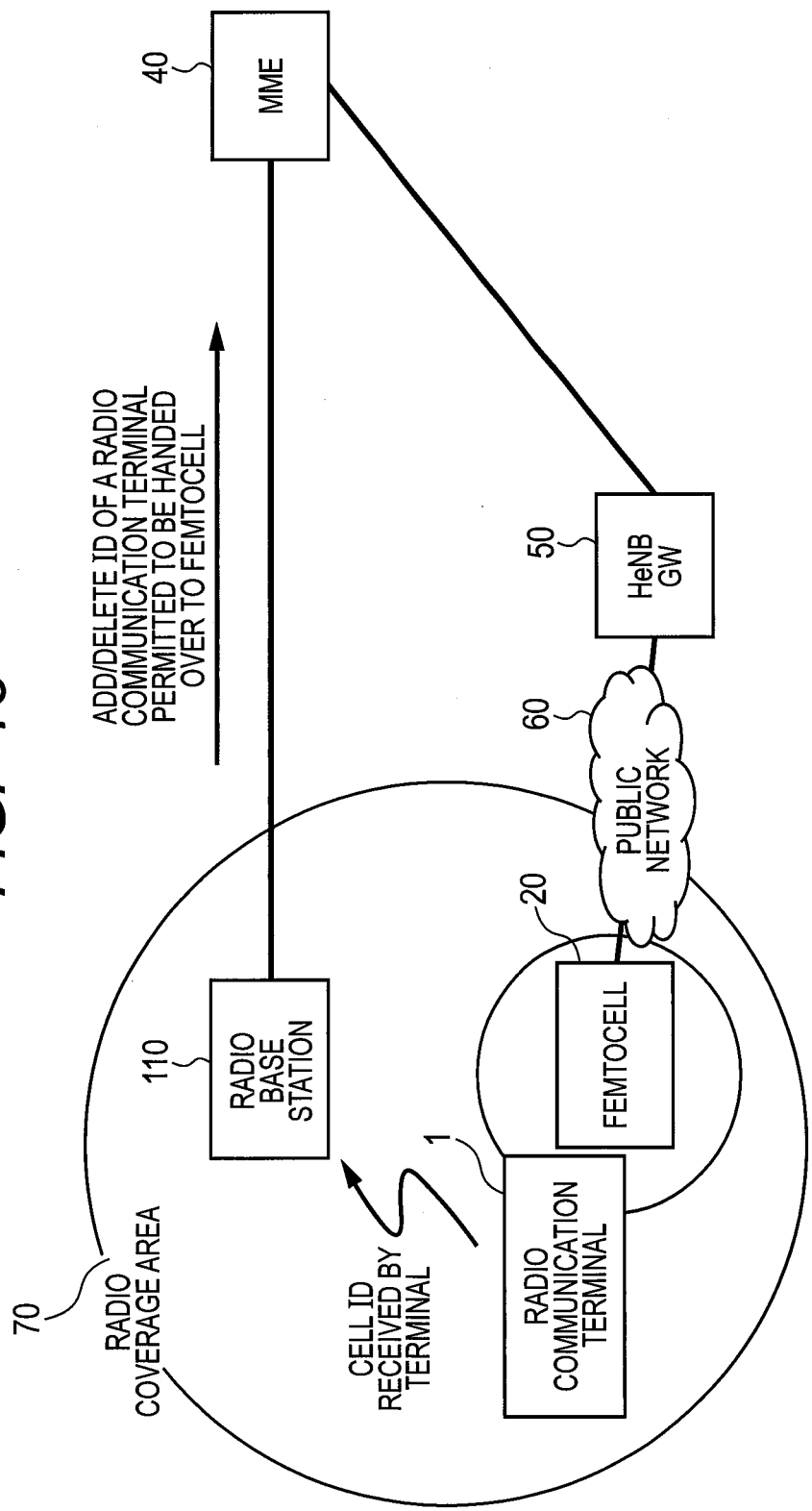
FIG. 15 is an entire architectural diagram of a system according to a second embodiment.

FIG. 15 is an architectural diagram of a radio communication system according to the second embodiment.

The radio communication system includes, for example, a radio base station 110, a femtocell 20, and an MME 40. The system may further include a HeNBGW 50 and a radio communication terminal 1. The number of femtocells, radio base stations, etc. is the same as in the first embodiment.

The radio communication terminal 1 communicates with the radio base station 110 and the femtocell 20 exists in a radio coverage area 70 formed by the radio base station 110. In this situation, the radio communication terminal 1 reports the ID(s) (base station ID(s)) of one or more radio base stations and femtocells from which it received radio waves to the radio base station 110. The radio base station 110 collects reported base station IDs and received power at the radio base station from a radio communication terminal 1 and aggregates values of received power from the radio communication terminal 1 and the frequency of reporting each base station ID. From the result of the aggregation, the radio base station 110 extracts the ID of a radio communication terminal required to be handed over to a femtocell 20 and sends to the MME 40 a request to add or delete the ID of the radio communication terminal 1 that can be handed over to the femtocell 20. The MME 40 sends a handover request to the femtocell 20 via the HeNBGW 50 and a public network 60.

Although this embodiment is also described, taking the femtocell as an example, it does not apply only to the femtocell and an appropriate base station placed indoors and having an area relatively smaller than the area of the radio base station 100 may replace the femtocell, as is the case for the first embodiment.

Figure 16:
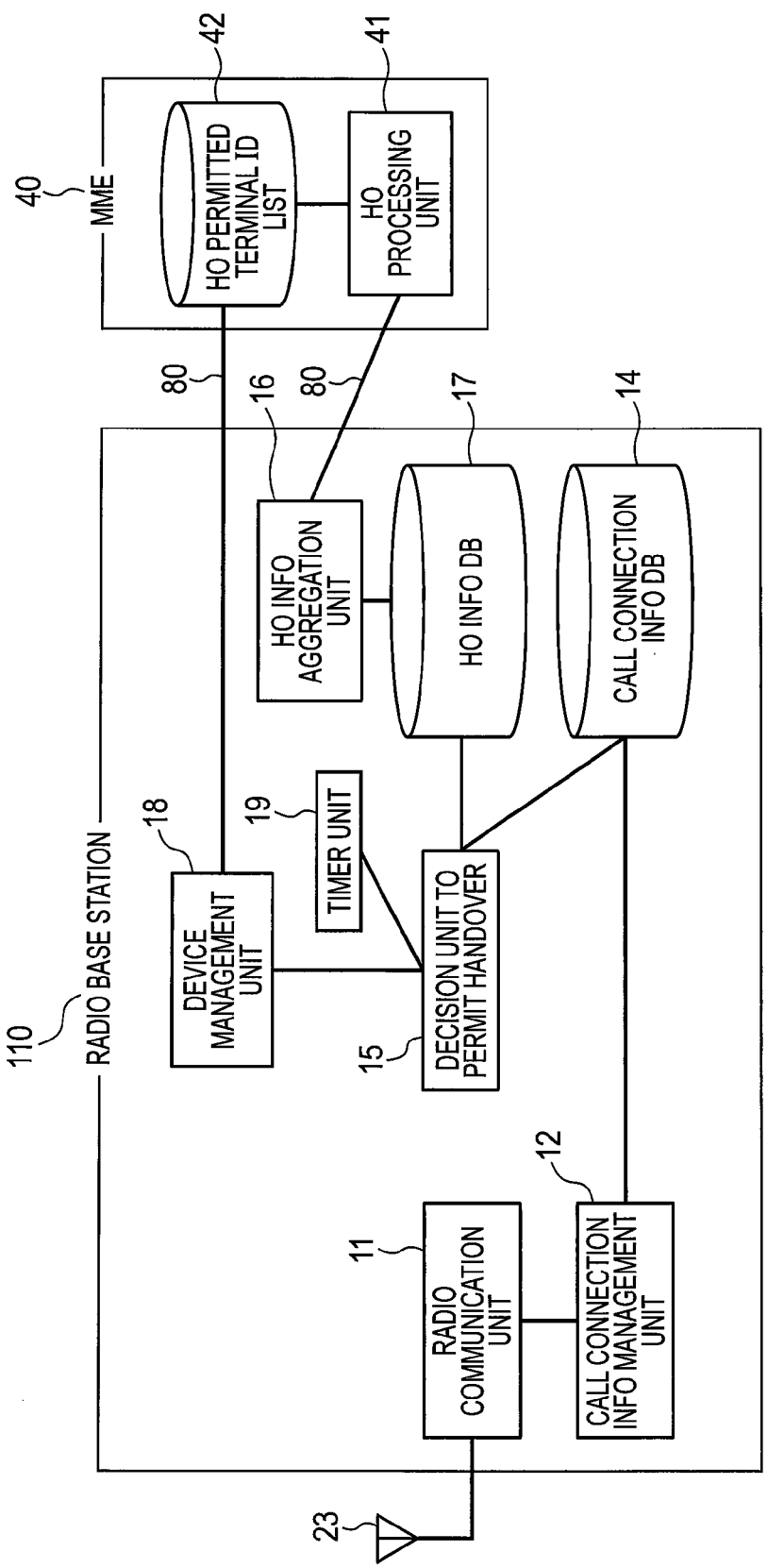
FIG. 16 is a detailed structural diagram of the system according to the second embodiment.

FIG. 16 is a detailed structural diagram of a management system according to the second embodiment. With regard to each device in the radio communication system shown in FIG. 15, blocks relevant to the present embodiment are shown. Each device may include appropriate blocks for data communication and transmitting/receiving control signals, other than the blocks shown here.

A radio base station ID reported and received power from a radio communication terminal 1 are received by an antenna 13 and sent via a radio communication unit 11 to a call connection information management unit 12. The call connection information management unit (connection information management unit) 12 stores these pieces of information collected from radio communication terminals into a call connection information database (DB) 14. A handover (HO) information aggregation unit (handover information management unit) 16 is connected with a handover (HO) processing unit 41 in the MME 40 via a wired network 80. This unit 16 collects information on a rejected handover of a radio communication terminal to a femtocell when the handover processing unit 41 has decided to reject the handover because the radio communication terminal ID is not registered with the MME and updates a handover (HO) information database (DB) 17. A decision unit to permit handover 15 refers to the call connection information database 14 and the handover information database 17, extracts the ID of a radio communication terminal that should be temporarily permitted to be handed over to a femtocell or should be deleted, and sends the extracted radio communication terminal ID to a device management unit 18. The device management unit 18 having received it updates a handover permitted terminal ID list 42 in the MME 40 connected with it by a wired network 80. By using a timer unit 19, it is possible to execute these processes described above periodically.

FIG. 17 is a structural diagram of a radio base station in the second embodiment. The radio base station 110 includes, for example, a radio communication unit 11 connected to an antenna 13, a call connection information management unit 12, a call connection information database 14 that accumulates information collected by the call connection information management unit 12, a handover information collection unit 16 that collects handover information from the MME 40, a handover information database 17 that accumulates information collected by the handover information collection unit 16, a decision unit to permit handover 15 that decides whether to temporarily permit a handover of a terminal to a femtocell from information held by the call connection information database 14 and the handover information database 17, a device management unit 18 that adds/deletes the ID of a radio communication terminal permitted/reject to be handed over to a femtocell to/from the handover permitted terminal ID list 42 in the MME 40, and a timer unit 19 for periodical execution of these processes. Details and modification examples of these components are the same as for the corresponding components of the handover management apparatus in the first embodiment.

FIG. 18 is a flowchart for deciding whether to permit a handover according to the second embodiment. In the present embodiment, because the radio base station 110 cannot collect interference power at a femtocell 20, there is no step of deciding whether interference power is more than the threshold, corresponding to the process 100 in FIG. 7. The remaining steps are the same as in FIG. 7.

A femtocell 20 may have an interface to communicate interference power to the radio base station 110 and the flowchart may include a decision by interference power.

As in the present embodiment, by providing each base station with the call connection information database 14, handover information database 17, handover information collection unit 16, and decision unit to permit handover 15, control on the basis of each radio base station is enabled and thus a control cycle can be shortened.

It should be noted that the present invention is not limited the above described embodiments and various modification examples are included therein. For example, these embodiments have been described in detail to explain the present invention in an easy-to-understand manner and a structure, configuration, or architecture disclosed herein is not necessarily limited to that including all components described. A subset of the components of an embodiment can be replaced by components of another embodiment and a component of another embodiment can be added to the components of an embodiment. Besides, with respect to a subset of the components of each embodiment, another component can be added to it, a component can be deleted from it, or a component can be replaced by another component.

3. CONFIGURATION EXAMPLES

Configuration Example 1

In a radio communication system where there are, for example, a radio communication terminal, a radio base station with which the radio communication terminal communicates, a femtocell existing in a radio coverage area formed by the radio base station, a HeNBGW to which the above entities are connected, and a handover management apparatus that manages each of the above devices, the handover management apparatus includes a call connection information aggregation unit and a handover information aggregation unit, which are provided with means for collecting, from the above radio base station, received power from a radio communication terminal at the radio base station and information on radio base station IDs reported from a terminal, means for collecting interference power at a femtocell and, means for collecting information on a rejected handover to a femtocell by MME, a decision unit to permit handover that decides whether to permit a handover to a femtocell and extracts the ID of a radio communication terminal to be handed over from a set of information thus collected, a device management unit that updates a handover permitted terminal ID list in MME, and a timer unit for periodical control of the operations of the above units.

Configuration Example 2

In the handover management apparatus of configuration example 1, or in the radio base station (as in the second embodiment), a process deciding whether to permit a handover and an updation of the handover permitted terminal ID list are executed at regular intervals or triggered by a handover rejection by MME.

Configuration Example 3

The radio base station is provided with the functions of the call connection information aggregation unit and handover information aggregation unit, the decision unit to permit handover, the device management unit, and the timer unit.

Configuration Example 4

A femtocell measures interference power received by it and has an interface for reporting a measured value of interference power to the handover management unit.

Configuration Example 5

A femtocell has an interface for reporting interference power measured by it to a radio base station existing in its periphery.

Configuration Example 6

A handover control method monitors received power from a radio communication terminal existing in a radio coverage area formed by a radio base station, decides that the radio communication terminal is located indoors, if time during which the received power from the terminal is less than a threshold continues for a given period of time or longer and the frequency of reporting the radio base station ID currently communicating with the terminal has become not more than a given value, and, after detecting that a handover of the radio communication terminal to a femtocell was rejected by MME because the radio communication terminal ID is not registered, temporarily permits a handover of the radio communication terminal to all femtocells existing in the radio coverage area.

Configuration Example 7

In the control method of configuration example 6, control is performed using different values of the above threshold for decision with respect to each radio coverage area.

Configuration Example 8

In the above control method, a femtocell can allow a radio communication terminal temporarily permitted to communicate with it to be registered to it.

Configuration Example 8

In the control method of configuration examples 6 and 7, using the femtocell, control is executed, if the interference power at the femtocell is equal to or more than a given value.

The present invention can be used, for example, in a radio communication system.

What is claimed is:

1. A handover management apparatus in a network system including a first base station, a second base station whose coverage cell overlaps with a cell of the first base station, and a management device that manages permission/rejection information indicating whether or not a handover to a second base station is permitted, the handover management apparatus comprising:

a connection information management unit that acquires, from said first base station, received power from a radio terminal at the first base station at given intervals;

a handover information management unit that acquires, from the management device, the identifier of a radio terminal rejected to be handed over to a second base station; and a decision unit to permit handover that finds a radio terminal fulfilling a first condition that the received power from the radio terminal acquired by said connection information management unit is not more than a predetermined first threshold and a state in which said received power is not more than said first threshold continues for a predetermined period of time and transmits to said management device a request to temporarily permit a handover of the thus found radio terminal to a second base station;

wherein said decision unit to permit handover finds a radio terminal fulfilling said first condition and fulfilling a second condition that a handover of the radio terminal to a second base station was rejected, based on the identifier of the radio terminal acquired by said handover information management unit;

wherein said connection information management unit collects the frequency of reporting a base station identifier, reported from a radio terminal that received radio waves from base stations including the first and second base stations; and wherein said decision unit to permit handover finds a radio terminal fulfilling said first and second conditions and fulfilling a third condition that the frequency of reporting the identifier of the first base station now communicating with the radio terminal is not more than a predetermined second threshold.

2. The handover management apparatus according to claim 1, wherein said connection information management unit acquires interference power at a second base station from the second base station, and wherein said decision unit to permit handover finds a radio terminal fulfilling said first and second conditions and fulfilling a fourth condition that the interference power at the second base station is not less than a third threshold.

3. The handover management apparatus according to claim 1, wherein the handover management apparatus transmits to said management device a request to temporarily permit a handover of said radio terminal to a plurality of second base stations existing in a radio coverage area covered by said first base station.

4. The handover management apparatus according to claim 1, wherein said decision unit to permit handover transmits to said management device a cancel request to cancel the temporary handover permission, triggered by an event that said radio terminal temporarily permitted to be handed over to a second base station, after handed over to the second base station, has further been handed over from the second base station to said first base station or any other base station.

5. The handover management apparatus according to claim 1, wherein said decision unit to permit handover uses different threshold values with respect to each of radio coverage areas covered by a plurality of first base stations respectively.

6. A base station in a network system including a first base station, a second base station whose coverage cell overlaps with a cell of the first base station, and a management device that manages permission/rejection information indicating whether or not a handover to a second base station is permitted, the base station being the first base station comprising:

a connection information management unit that acquires received power from a radio terminal at given intervals;

a handover information management unit that acquires, from the management device, the identifier of a radio terminal rejected to be handed over to a second base station; and a decision unit to permit handover that finds a radio terminal fulfilling a first condition that the received power from the radio terminal acquired by said connection information management unit is not more than a predetermined first threshold and a state in which said received power is not more than said first threshold continues for a predetermined period of time and transmits to said management device a request to temporarily permit a handover of the thus found radio terminal to a second base station;

wherein said decision unit to permit handover finds a radio terminal fulfilling said first condition and fulfilling a second condition that a handover of the radio terminal to a second base station was rejected, based on the identifier of the radio terminal acquired by said handover information management unit;

wherein said connection information management unit collects the frequency of reporting a base station identifier, reported from a radio terminal that received radio waves from base stations including the first and second base stations; and wherein said decision unit it handover finds a radio terminal fulfilling said first and second conditions and fulfilling a third condition that the frequency of reporting the identifier of the first base station itself is not more than a predetermined second threshold.

7. The base station according to claim 6, wherein said connection information management unit acquires interference power at a second base station from the second base station, and wherein said decision unit to permit handover finds a radio terminal fulfilling said first and second conditions and fulfilling a fourth condition that the interference power at the second base station is not less than a third threshold.

8. The base station according to claim 6, wherein the first base station transmits to said management device a request to temporarily permit a handover of said radio terminal to a plurality of second base stations existing in a radio coverage area covered by said first base station.

9. The base station according to claim 6, wherein said decision unit to permit handover transmits to said management device a cancel request to cancel the temporary handover permission, triggered by an event that said radio terminal temporarily permitted to be handed over to a second base station, after handed over to the second base station, has further been handed over from the second base station to said first base station or any other base station.

10. The base station according to claim 6, wherein said decision unit to permit handover uses different threshold values with respect to each of radio coverage areas covered by a plurality of first base stations respectively.

11. A handover management method for use in a network system including a first base station, a second base station whose coverage cell overlaps with a cell of the first base station, and a management device that manages permission/rejection information indicating whether or not a handover to a second base station is permitted, the handover management method comprising:

acquiring received power from a radio terminal at a first base station at given intervals;

acquiring, from the management device, the identifier of a radio terminal rejected to be handed over to a second base station;

finding a radio terminal fulfilling a first condition that the received power from the radio terminal acquired is not more than a predetermined first threshold and a state in which said received power is not more than said first threshold continues for a predetermined period of time; and transmitting to the management device a request to temporarily permit a handover of the thus found radio terminal to a second base station;

finding a radio terminal fulfilling the first condition and fulfilling a second condition that a handover of the radio terminal to a second base station was rejected, based on the identifier of the radio terminal acquired;

collecting the frequency of reporting a base station identifier, reported from a radio terminal that received radio waves from base stations including the first and second base stations; and finding a radio terminal fulfilling the first and second conditions and fulfilling a third condition that the frequency of reporting the identifier of the first base station is not more than a predetermined second threshold.

12. The handover management method according to claim 11 further comprising:

acquiring interference power at a second base station from the second base station; and finding a radio terminal fulfilling the first and second conditions and fulfilling a fourth condition that the interference power at the second base station is not less than a third threshold.

13. The handover management method according to claim 11, further comprising:

transmitting to said management device a request to temporarily permit a handover of said radio terminal to a plurality of second base stations existing in a radio coverage area covered by said first base station.

14. The handover management method according to claim 11, further comprising:

transmitting to said management device a cancel request to cancel the temporary handover permission, triggered by an event that said radio terminal temporarily permitted to be handed over to a second base station, after handed over to the second base station, has further been handed over from the second base station to said first base station or any other base station.

15. The handover management method according to claim 11, further comprising:

using different threshold values with respect to each of radio coverage areas covered by a plurality of first base stations respectively.

* * * * *